US007991996B2

(12) United States Patent
Benantar et al.

(10) Patent No.: US 7,991,996 B2
(45) Date of Patent: *Aug. 2, 2011

(54) ARCHITECTURE AND DESIGN FOR CENTRAL AUTHENTICATION AND AUTHORIZATION IN AN ON-DEMAND UTILITY ENVIRONMENT

(75) Inventors: Messaoud Benantar, Austin, TX (US); Yen-Fu Chen, Austin, TX (US); John W. Dunsmoir, Round Rock, TX (US); Randolph Michael Forlenza, Austin, TX (US); Wei Liu, Wexford, PA (US); Sandra Juni Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/410,933

(22) Filed: Mar. 25, 2009

(65) Prior Publication Data
US 2009/0204810 A1    Aug. 13, 2009

Related U.S. Application Data

(63) Continuation of application No. 10/782,443, filed on Feb. 19, 2004, now Pat. No. 7,519,812.

(51) Int. Cl.
*H04L 29/06* (2006.01)
(52) U.S. Cl. ........................................ 713/156
(58) Field of Classification Search .................. None
See application file for complete search history.

(56) References Cited

U.S. PATENT DOCUMENTS

| | | | |
|---|---|---|---|
| 5,793,868 A | 8/1998 | Micali | |
| 6,128,740 A | 10/2000 | Curry et al. | |
| 6,285,991 B1 | 9/2001 | Powar | |
| 6,321,333 B1 | 11/2001 | Murray | |
| 6,430,688 B1 | 8/2002 | Kohl et al. | |
| 6,553,568 B1 | 4/2003 | Fijolek et al. | |
| 6,571,221 B1 | 5/2003 | Stewart et al. | |
| 6,611,869 B1 | 8/2003 | Eschelbeck et al. | |
| 6,615,347 B1 | 9/2003 | de Silva et al. | |
| 6,839,708 B1* | 1/2005 | Boydstun et al. | 1/1 |
| 7,171,411 B1 | 1/2007 | Lewis et al. | |
| 7,412,719 B2 | 8/2008 | Benantar et al. | |
| 2002/0128981 A1 | 9/2002 | Kawan et al. | |
| 2003/0028495 A1* | 2/2003 | Pallante | 705/78 |

(Continued)

OTHER PUBLICATIONS

IBM, "Living in an On Demand World", Oct. 2002, 6 pages.

(Continued)

*Primary Examiner* — Brandon S Hoffman
(74) *Attorney, Agent, or Firm* — Yee & Associates, P.C.; Mark C. Vallone

(57) ABSTRACT

A Centralized Authentication & Authorization (CAA) system that facilitates secure communication between service clients and service providers. CAA comprises a Service Request Filter (SRF), a Service Client Authentication Program (SCAP), a Service Authorization Program (SAP), and an Authorization Database (ADB). The SRF intercepts service requests, extracts the service client's identifier from a digital certificate attached to the request, and stores the identifier in memory accessible to service providers. In the preferred embodiment, the SRF forwards the service request to a web service manager. The web service manager invokes SCAP. SCAP matches the identifier with a record stored in ADB. SAP queries ADB to determine if the service request is valid for the service client. If the service request is valid, SAP authorizes the service request and the appropriate service provider processes the service request.

15 Claims, 1 Drawing Sheet

U.S. PATENT DOCUMENTS

2009/0037731 A1   2/2009   Benantar et al.

OTHER PUBLICATIONS

Vasudevan, "A Web Services Primer", Apr. 2001, 10 pages. www.xml.com/pub/a/ws/2001/04/04webservices/index.html.
Tech Encyclopedia, "Web Services", 2004, 3 pages.
Rajaraman, "What Web Services Are Not", Feb. 2002, 2 pages.
Webopedia.com, "Web Services", Sep. 2003, 3 pages.
Tech Encyclopedia, "Digital Certificate", 2004, 3 pages.
Kirtland, "A Platform for Web Services", Jan. 2001, 7 pages. www.msdn.microsoft.com.
Schneier, Bruce, "Applied Cryptography", Second Edition, 1996, John Wiley & Sons, Inc., NY, pages 56-59.
USPTO Office action for U.S. Appl. No. 10/850,398 dated Jul. 23, 2007.
USPTO Final Office action for U.S. Appl. No. 10/850,398 dated Dec. 13, 2007.
USPTO Notice of allowance for U.S. Appl. No. 10/850,398 dated May 12, 2008.
USPTO Office action for U.S. Appl. No. 12/147,716 dated Dec. 2, 2009.
USPTO Notice of allowance for U.S. Appl. No. 12/147,716 dated Apr. 26, 2010.
USPTO Final Office action for U.S. Appl. No. 10/782,443 dated Jul. 16, 2008.
USPTO Notice of allowance for U.S. Appl. No. 10/782,443 dated Dec. 4, 2008.

* cited by examiner

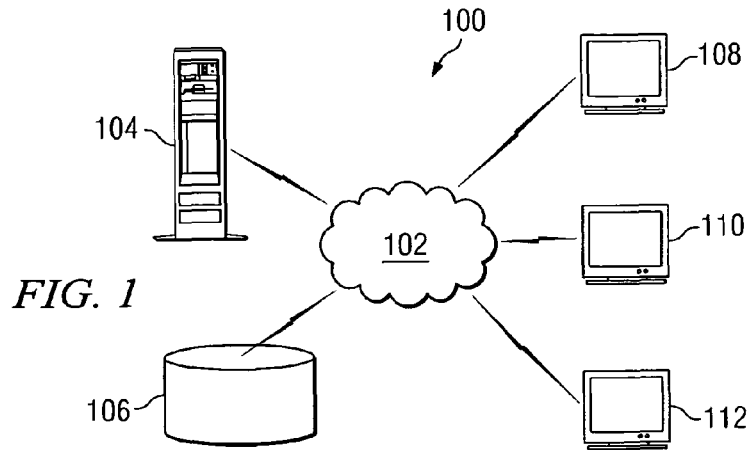
*FIG. 1*
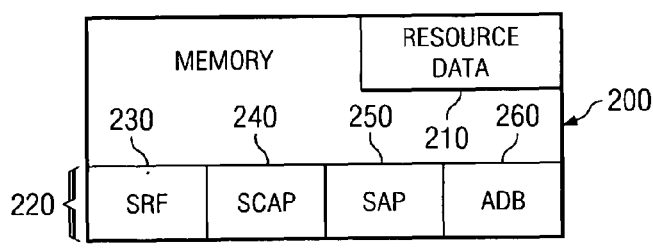
*FIG. 2*
*FIG. 3*
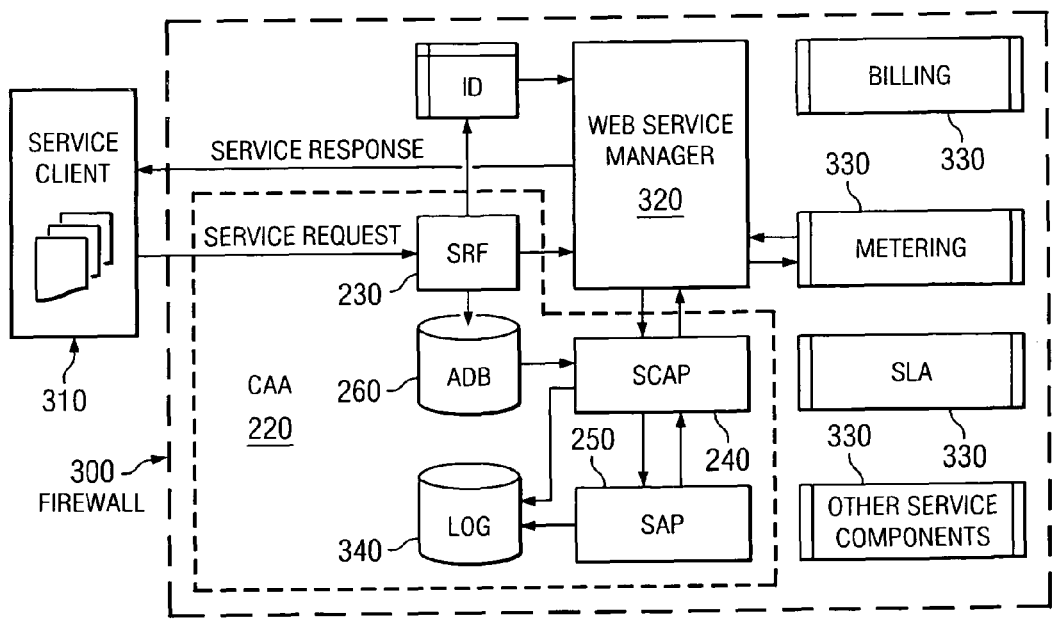

ARCHITECTURE AND DESIGN FOR CENTRAL AUTHENTICATION AND AUTHORIZATION IN AN ON-DEMAND UTILITY ENVIRONMENT

This application is a continuation of Ser. No. 10/782,443, now U.S. Pat. No. 7,519,812, filed Feb. 19, 2004.

FIELD OF THE INVENTION

The present invention relates in general to network security, and, in particular, to authentication and authorization for services delivered over a network.

BACKGROUND OF THE INVENTION

For many years, network technology has enabled the sharing of, and remote access to, computing resources around the world. One computer can readily exchange data with a computer down the hall or in another country. Of course, it did not take long for the business world to harness the power of global networks, and network technology has fueled the growth of an entire new industry focused on delivering services across these networks.

Commonly referred to as "web services," "application services," or "web service applications," networks services typically expose existing business functionality over networks in a controlled environment and allow multiple applications to interact with each other. Web service applications use standards such as Extensible Markup Language (XML), Simple Object Access Protocol (SOAP), and Hypertext Transfer Protocol (HTTP) that are widely available and accepted to facilitate interaction across networks. XML provides a language to tag data so that the various components of a web service application can understand the request. SOAP is a method of packaging data before transmitting it across a network. HTTP is a transport protocol that delivers data across the network. Web service applications usually run in the background and do not have a graphical user interface (GUI). Rather, web services interact via a service program interface (SPI). An SPI is defined strictly in terms of the messages that the web service accepts. Thus, a typical web service invocation consists of a first application (hereinafter referred to as the "service client") sending an XML message, which is packaged in a SOAP "envelope," across the network via HTTP to a second application (hereinafter referred to as the "service provider"). The format of the XML message, of course, must comply with the requirements of the service provider's SPI. Web service applications can perform a wide variety of functions, ranging from simple stock quote requests to complicated billing processes. A web service invocation has many common names, including a "service request," a "request call," or just a "call." For the sake of simplicity and clarity, any communication between a service client and a service provider for the purpose of invoking a service will be referred to here as a "service request."

Generally, a business needs to control access to web services to maximize profit and to protect internal computing resources. In general, a business achieves control by requiring service requests to pass through a web service manager, which acts much like a firewall. A web service manager controls access on two levels: the service client level and the service agreement level. To gain access to the desired web service, a service client must first present credentials to the web service manager. The web service manager then must determine whether the credentials are authentic. If the credentials are authentic, the web service manager then determines whether the service client is entitled to receive the service that the service client requested. Finally, if the credentials are authentic and the service client is authorized to access the service provider, the web service manager authorizes the service provider to process the request.

Several methods of authentication are known in the art. The most conventional method requires each client to have a unique identifier (ID) and a password that only the client knows. Every time a client needs to access a service, the client must present an ID and a password that the network service provider can match to the ID presented. Naturally, both the client and the network service provider must keep the password from being unduly disclosed or otherwise disseminated. Passwords must also be difficult to guess. To make passwords difficult to guess, many businesses implement complex security policies that require passwords to meet strict criteria and require clients to change passwords frequently.

Proprietary authentication methods, such as IBM's WEB IDENTIY or TIVOLI ACCESS MANAGER, can also be used to control access to network services, but these methods are highly complex and require significant overhead.

Digital certificates are another alternative to the ID/password approach. Digital certificates are generally issued by a certification authority, which is typically a trusted third-party organization or company. Alternatively, digital certificates can be "self-signed." A self-signed certificate is created by the holder of the certificate, but is still useful if the parties to a transaction are already familiar with each other and the integrity of the certificate is initially verified manually. A digital certificate is usually encrypted, and usually contains a holder's name or identifier, a serial number, and expiration date. X.509 is the most common digital certificate format, and is the format recommended by the International Telecommunications Union. The holder's name or identifier is commonly represented as a Distinguished Name, which is a part of the X.500 standard (also promulgated by ITU). A Distinguished Name is comprised of a combination of other X.500 identifiers, which may include a Common Name, an Organizational Unit, Organization, and Country.

Digital certificates obviate the need for passwords and provide significant advantages over the use of IDs and passwords. An obvious advantage is that users do not have to conjure up or remember complicated passwords. Furthermore, digital certificates obviate the need to implement complicated security policies to ensure that passwords are difficult to guess, and they reduce the risk of security compromise through lost or exposed passwords.

Although the art of using digital certificates is not new, integrating digital certificate technology into existing technologies, particularly web service applications, is extremely challenging. In particular, many existing web service applications have been designed to authenticate users based on an ID that is typically embedded in the service request. Thus, existing web service applications do not generally recognize IDs that are encoded in a digital certificate. Therefore, a need exists for an authentication mechanism that can be integrated with existing web services technology while reaping the benefits of digital certificate technology.

SUMMARY OF THE INVENTION

The invention described herein comprises a Centralized Authentication & Authorization system (CAA). The CAA facilitates secure communication between web service applications by maintaining an authorization database and providing authentication services to other web service applications.

CAA comprises a Service Request Filter (SRF), a Service Client Authentication Program (SCAP), a Service Authorization Program (SAP), and an Authorization Database (ADB). The Service Request Filter intercepts incoming service requests, extracts the service client's identifier from a digital certificate attached to the request, stores the identifier in an object that is accessible to web service applications, and forwards the original request on its original route. Typically, a web service manager will receive the original request and invoke the Service Client Authentication Program. The Service Client Authentication Program matches the identifier with an identifier stored in Authorization Database and validates the service client. The Service Authorization Program then queries Authorization Database to determine if the service request is valid for the service client. If the service request is valid, the Service Authorization Program authorizes the service request and the appropriate service provider processes the service request.

BRIEF DESCRIPTION OF DRAWINGS

FIG. 1 is a depiction of a typical networked computing environment in which the integrated server architecture could be implemented;

FIG. 2 represents the memory configuration of a typical computing workstation using the integrated server architecture; and FIG. 3 is a depiction of the logical design of the present invention.

DETAILED DESCRIPTION OF THE PREFERRED EMBODIMENT

The foregoing and other objects, features, and advantages of the invention will be apparent from the following more particular description of the preferred embodiment of the invention, as illustrated in the accompanying drawings wherein like reference numbers represent like parts of the invention.

As used herein, the term "application" means any unit of executable machine instructions, including without limitation any software, process, program, module, function, or routine.

The term "authenticate" refers to the process of determining whether a digital certificate is valid.

The term "authorize" refers to the process of determining whether a service client presenting an authentic digital certificate is entitled to access a particular web service application.

The term "communication channel" means any pathway over which data is, or may be, transferred between applications, including without limitation any physical or electromagnetic medium, such as a telephone line, optical fiber, coaxial cable or twisted pair wire, or radio wave.

The term "database" means any collection of data stored together and organized for rapid search and retrieval, including without limitation flat file databases, fielded databases, full-text databases, object-oriented databases, and relational databases.

The term "service client" refers to any web service application that attempts to access a function or service of another web service application over a communication channel using a service program interface.

The term "service client identifier" means any set of characters, numbers, marks, or other form of code that allows a service provider to distinguish one service client from another, or to establish the origin of a service request.

The term "service program interface" means a set of messages that a web service application can accept and interpret.

The term "service provider" refers to any web service application that can process a message sent on a communication channel through a service program interface and return output on a communication channel through a service program interface.

The term "service request" means any message sent from a service client on a communication channel through a service program interface to a service provider.

The term "web service application" means any application, machine, or other device that is capable of processing messages from and returning output to other applications, machines, or devices.

The term "web service architecture" means a group of applications, machines, or other devices, or any combination thereof, that permits a service client to send a service request on a communication channel to a service provider, and permits a service provider to return a response to the service client on a communication channel.

The term "web service manager" means any application, machine, or other device that listens on a communication channel for incoming service requests, routes service requests to appropriate applications, accepts output from applications, and forwards the output on a communication channel.

The present invention can be implemented in many different configurations, including software, hardware, or any combination thereof. The CAA itself may be considered a web service application, but it may also be viewed as an integral component of a web service architecture design. For the sake of clarity and simplicity, the invention is described as it would operate in conjunction with an existing web service architecture.

FIG. 1 is an illustration of computer network 100 associated with the present invention. Computer network 100 comprises local workstation 108 electrically coupled to network connection 102. Local workstation 108 is electrically coupled to remote workstation 110 and remote workstation 112 via network connection 102. Local workstation 108 is also electrically coupled to server 104 and persistent storage 106 via network connection 102. Network connection 102 may be a simplified local area network (LAN) or may be a larger network such as a wide area network (WAN) or the Internet. Furthermore, computer network 100 depicted in FIG. 1 is intended as a representation of a possible operating network that may contain the present invention and is not meant as an architectural limitation.

The internal configuration of a computer, including connection and orientation of the processor, memory, and input/output devices, is well known in the art. The present invention is a methodology that can be embodied in a computer program. Referring to FIG. 2, the methodology of the present invention is implemented in CAA 220, which resides in memory 200. CAA 220 comprises SRF 230, SCAP 240, SAP 250, and ADB 260. CAA 220 described herein can be stored within memory 200 of any workstation or server depicted in FIG. 2. Alternatively, CAA 220 can be stored in an external storage device such as persistent storage 106, or a removable disk such as a CD-ROM (not pictured). Memory 200 is only illustrative of memory within one of the machines depicted in FIG. 2 and is not meant as a limitation. Memory 200 also contains resource data 210. The present invention may interface with resource data 210 through memory 200.

In alternative embodiments, CAA 220 and its components can be stored in the memory of other computers. Storing CAA 220 in the memory of other computers allows the processor workload to be distributed across a plurality of processors instead of a single processor. Further configurations of CAA 220 across various multiple memories and processors are known by persons skilled in the art.

FIG. 3 provides an overview of the operation of the present invention when implemented with existing web service architecture 300 that normally relies on ID/password authentication. The operation is initiated when service client 310 sends a service request (e.g. for a metering log, service level agreement evaluation, etc.). The service request is accompanied by the service client's digital certificate. Service client 310 sends both the service request and the digital certificate over a communication channel using a service program interface. Without CAA 220, the service request typically would be received by the desired service provider or a web service manager listening on the communication channel. In the preferred embodiment of CAA 220, though, SRF 230 intercepts all service requests before they reach service provider 330 or web service manager 320. SRF 230 authenticates the service client's digital certificate with the issuing certification authority. If SRF 230 is unable to authenticate the digital certificate, SRF 230 refuses the request and notifies service client 310. If SRF 230 successfully authenticates the digital certificate with the certification authority, SRF 230 extracts the service client identifier from the digital certificate and stores the service client identifier in memory that other web service applications, including web service manager 320, can access. The process of decrypting, validating, and extracting information from digital certificates is well known in the art and need not be described here. In the preferred embodiment, the service client identifier is stored in a JAVA security object, which is essentially a global hash table. A person of skill in the art will appreciate that the service client identifier can be stored in other types of data structures, including databases, but security objects provide better performance and require less overhead than other data structures. The use of JAVA security objects also is well known in the art and is not described in detail here. SRF 230 then forwards the service request on the same communication channel. In the preferred embodiment, web service manager 320 receives the request, and retrieves the service client identifier from the JAVA security object. Web service manager 320 then sends an authentication request to SCAP 240. SCAP 240 then attempts to match the service client identifier with a service client record in ADB 260. In the preferred embodiment, SCAP 240 records the service client identifier in authorization log 340. If SCAP 240 successfully matches the service client identifier with a service client record, SCAP 240 sends a request to SAP 250 to authorize the service request. In the preferred embodiment, SAP 250 records the service request in authorization log 340. If the service request is authorized (i.e. the service client has paid for or is otherwise entitled to the service), SAP 250 returns an authorization to web service manager 320, and web service manager 320 routes the request to service provider 330 to process the service request. Service provider 330 processes the service request and returns the output to web service manager 320. Web service manager 320 formats the output and returns the output over the communication channel to service client 310.

A person of skill in the art will appreciate that various modifications and changes may be made in the preferred embodiment of the present invention without departing from its true spirit. The preceding description is for illustrative purposes only and should not be construed in a limiting sense. The scope of the invention should be limited only by the language of the following claims.

What is claimed is:

1. A computer system for authenticating and authorizing a service request sent from a service client through a firewall to a service provider, the computer system comprising:
   one or more processors, one or more computer-readable memories and one or more computer-readable, tangible storage devices;
   program instructions, stored on at least one of the one or more computer-readable, tangible storage devices for execution by at least one of the one or more processors via at least one of the one or more computer-readable memories, to intercept an incoming service request from the service client on a communication channel, the service request having a digital certificate of the service client attached;
   program instructions, stored on at least one of the one or more computer-readable, tangible storage devices for execution by at least one of the one or more processors via at least one of the one or more computer-readable memories, to authenticate the digital certificate with an issuing certification authority;
   program instructions, stored on at least one of the one or more computer-readable, tangible storage devices for execution by at least one of the one or more processors via at least one of the one or more computer-readable memories, to extract a service client identifier from the digital certificate associated with the service request;
   program instructions, stored on at least one of the one or more computer-readable, tangible storage devices for execution by at least one of the one or more processors via at least one of the one or more computer-readable memories, to store the service client identifier in a memory;
   program instructions, stored on at least one of the one or more computer-readable, tangible storage devices for execution by at least one of the one or more processors via at least one of the one or more computer-readable memories, to forward the service request to a web service manager;
   program instructions, stored on at least one of the one or more computer-readable, tangible storage devices for execution by at least one of the one or more processors via at least one of the one or more computer-readable memories, to match, responsive to receiving an authentication request from the web service manager, the service client identifier with a service client record; and
   program instructions, stored on at least one of the one or more computer-readable, tangible storage devices for execution by at least one of the one or more processors via at least one of the one or more computer-readable memories, to authorize, responsive to matching the service client identifier with the service client record, the service request.

2. The computer system of claim 1, wherein the digital certificate is an X.509 digital certificate.

3. The computer system of claim 1, wherein the service client identifier is a Distinguished Name.

4. The computer system of claim 1, wherein the digital certificate is self-signed.

5. The computer system of claim 1, further comprising an authorization log stored on at least one of the one or more computer-readable, tangible storage devices.

6. The computer system of claim 5, further comprising program instructions, stored on at least one of the one or more computer-readable, tangible storage devices for execution by at least one of the one or more processors via at least one of the one or more computer-readable memories, to record the service client identifier in the authorization log.

7. The computer system of claim 5, further comprising program instructions, stored on at least one of the one or more computer-readable, tangible storage devices for execution by at least one of the one or more processors via at least one of the one or more computer-readable memories, to record the service client identifier and the service request in the authorization log.

8. A web service architecture having the computer system of claim 1.

9. A computer program product for authenticating and authorizing a service request sent from a service client through a firewall to a service provider, the computer program product comprising:
   one or more computer-readable, tangible storage devices;
   program instructions, stored on at least one of the one or more computer-readable, tangible storage devices, to intercept an incoming service request from the service client on a communication channel, the service request having a digital certificate of the service client attached;
   program instructions, stored on at least one of the one or more computer-readable, tangible storage devices, to authenticate the digital certificate with an issuing certification authority;
   program instructions, stored on at least one of the one or more computer-readable, tangible storage devices, to extract a service client identifier from the digital certificate associated with the service request;
   program instructions, stored on at least one of the one or more computer-readable, tangible storage devices, to store the service client identifier in a memory;
   program instructions, stored on at least one of the one or more computer-readable, tangible storage devices, to forward the service request to a web service manager;
   program instructions, stored on at least one of the one or more computer-readable, tangible storage devices, to match, responsive to receiving an authentication request from the web service manager, the service client identifier with a service client record; and
   program instructions, stored on at least one of the one or more computer-readable, tangible storage devices to authorize, responsive to matching the service client identifier with the service client record, the service request.

10. The computer program product of claim 9, wherein the digital certificate is an X.509 digital certificate.

11. The computer program product of claim 9, wherein the service client identifier is a Distinguished Name.

12. The computer program product of claim 9, wherein the digital certificate is self-signed.

13. The computer program product of claim 9, further comprising an authorization log stored on at least one or more computer-readable, tangible storage devices.

14. The computer program product of claim 13, further comprising program instructions, stored on at least one of the one or more computer-readable, tangible storage devices, to record the service client identifier in the authorization log.

15. The computer program product of claim 13, further comprising program instructions, stored on at least one of the one or more computer-readable, tangible storage devices, to record the service client identifier and the service request in the authorization log.

\* \* \* \* \*